US006984345B2

(12) United States Patent
Cho et al.

(10) Patent No.: US 6,984,345 B2
(45) Date of Patent: Jan. 10, 2006

(54) CAVITY-PREVENTING TYPE REACTOR AND A METHOD FOR FABRICATING A PREFORM FOR A PLASTIC OPTICAL FIBER USING THE SAME

(75) Inventors: Han Sol Cho, Daejun-Shi (KR); Jin Taek Hwang, Daejun-Shi (KR); Jin Sung Choi, Daejun-Shi (KR); Sung Hen Cho, Daejun-Shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 382 days.

(21) Appl. No.: 10/197,215

(22) Filed: Jul. 18, 2002

(65) Prior Publication Data

US 2003/0030159 A1 Feb. 13, 2003

(30) Foreign Application Priority Data

Jul. 18, 2001 (KR) .............................. 2001-43151
Dec. 13, 2001 (KR) .............................. 2001-78965

(51) Int. Cl.
*B29D 11/00* (2006.01)

(52) U.S. Cl. .................. 264/1.24; 264/1.27; 264/1.38; 264/2.1; 264/85; 422/209; 422/240; 425/174.4

(58) Field of Classification Search ............ 425/174.4, 425/435; 264/1.1, 2.1, 1.36, 1.38, 1.24, 1.27, 264/85; 422/209, 240, 201, 236, 139, 143
See application file for complete search history.

(56) References Cited

U.S. PATENT DOCUMENTS

| | | | |
|---|---|---|---|
| 5,253,323 | A | 10/1993 | Koike et al. |
| 5,382,448 | A | 1/1995 | Koike et al. |
| 5,593,621 | A | 1/1997 | Koike et al. |
| 6,166,107 | A | 12/2000 | van Duijnhoven et al. |

FOREIGN PATENT DOCUMENTS

| | | |
|---|---|---|
| DE | 42 14 259 C1 | 7/1993 |
| JP | 3-78706 | 4/1991 |
| JP | 378706 | 4/1991 |
| JP | 4-86603 | 3/1992 |
| JP | 486603 | 3/1992 |
| WO | 87/01071 | 2/1987 |
| WO | 92/03750 | 3/1992 |
| WO | 92/03751 | 3/1992 |
| WO | 92/10357 | 6/1992 |
| WO | 97/29903 | 8/1997 |

OTHER PUBLICATIONS

Koike, et al, "New interfacial-gel copolymerization technique for steric GRIN polymer optical waveguides and lens arrays", Applied Optics, 27(3):486-491 (Feb. 1988).

*Primary Examiner*—Mathieu D. Vargot
(74) *Attorney, Agent, or Firm*—Lee & Morse, P.C.

(57) ABSTRACT

A cavity-preventing type reactor and a method for fabricating a preform for a plastic optical fiber using the same, wherein post-process charging of additional monomer or prepolymer into rotationally-induced central cavities is avoided by forming void-free plastic fibers using special geometric flow controllers combined with special materials combinations, pressures, and rotational techniques.

21 Claims, 7 Drawing Sheets

CAVITY-PREVENTING TYPE REACTOR AND A METHOD FOR FABRICATING A PREFORM FOR A PLASTIC OPTICAL FIBER USING THE SAME

BACKGROUND OF THE INVENTION

1. Field of the Invention

The present invention relates to cavity prevention in preforming plastic optical fiber, and more particularly, to a cavity-preventing type reactor and a method for fabricating a preform for a plastic optical fiber using the same.

2. Description of the Related Art

Optical fibers used in the field of telecommunications are generally classified into a single-mode fiber and a multi-mode fiber in terms of the transmission mode of optical signal. Optical fibers currently used for long distance, high speed communications are mostly step-index, single-mode optical fibers based on quartz glass. These optical fibers have a diameter as small as 5 microns to 10 microns, and as a result, use of these glass optical fibers creates significant difficulties in terms of achieving proper alignment and connection. Accordingly, these glass optical fibers are associated with significant expenses relating to achieving proper alignment and connection.

Multi-mode glass optical fibers have a diameter that is larger than that of single-mode optical fibers and may be used for short distance communications such as in local area networks (LANs). However, these multi-mode glass optical fibers, in addition to being fragile, also suffer from expensive costs relating to achieving proper alignment and connection and therefore are not widely used. Accordingly, these multi-mode glass optical fibers have been mainly used for short distance communication applications of up to 200 meters, such as in LANs, which normally use a metal cable, for example, a twisted pair or coaxial cable. Since the data transmission capacity or bandwidth of the metal cable may be as low as about 150 Mbps, it cannot satisfy standards for transmission capacity, such as a speed of 625 Mbps that is associated with modem asynchronous transfer mode (ATM) for data transmission.

To overcome the foregoing, plastic optical fibers, which can be used in short distance communication applications, such as LANs, have been developed. The diameter of plastic optical fibers may be as large as 0.5 to 1.0 mm which is 100 or more times larger than that of glass optical fibers. Due to the flexibility of plastic optical fibers, proper alignment and connection are much easier to achieve with plastic optical fibers than with glass optical fibers. Moreover, since polymer-based connectors may be inexpensively produced using a compression molding, these connectors may be used for both alignment and connection, thereby further reducing costs.

Plastic optical fibers may have a step-index (SI) structure, in which a refractive index changes stepwise in a radial direction, or a graded-index (GI) structure, in which a refractive index changes gradually in a radial direction. However, since plastic optical fibers having a SI structure are characterized by a high modal dispersion, the transmission capacity (or bandwidth) of a signal cannot be larger than that of cable. On the other hand, since plastic optical fibers having a GI structure are characterized by a low modal dispersion, it can have a large transmission capacity. Therefore, GI plastic optical fibers have become widely used as a communication medium for short distance, high-speed communications.

Conventional methods for fabricating GI plastic optical fiber are mainly classified into two methods. A first method comprises a batch process, wherein a preliminary cylindrical molding product, namely, a preform in which a refractive index changes in a radial direction, is fabricated, and then the resultant preform is heated and drawn to fabricate GI plastic optical fiber. A second method comprises a continuous process wherein a plastic fiber is produced by an extrusion process, and then a low molecular material contained in the fiber is extracted to obtain GI plastic optical fiber. Alternatively, a low molecular material can be introduced to the fiber in a radial direction.

The first method can be used successfully to fabricate a GI plastic optical fiber having a data transmission capacity of 2.5 Gbps, and the second method can be used successfully to fabricate a plastic optical fiber having a relatively large data transmission capacity.

Another conventional method for fabricating GI preforms employs very high rotational speeds, e.g., about 20,000 rpm). This method uses the principle that if a mixture of monomers or polymer-dissolving monomers having different densities and refractive indexes is polymerized in a very strong centrifugal field over $10{,}000\times d^{-0.5}$ rpm, where d is a diameter of a preform, a concentration gradient is generated on account of a density gradient, and thereby, a refractive index gradient is generated. While a high rotational speed is known in the art as being advantageous in producing a definite refractive index profile, even in a relatively weak centrifugal field, a concentration (or refractive index) gradient develops, if there is a density difference between the components of a mixture.

A significant disadvantage of the aforementioned methods is a problem caused by volume shrinkage that occurs during (radical) chain polymerization, which is common in the fabrication of GI preform. For example, the extent of volume shrinkage from methylmethacrylate to poly(methylmethacrylate) is over 20%. Since volume shrinkage occurs when monomers are polymerized (to produce a polymer), a preform for a plastic optical fiber fabricated under the rotation of a reactor forms a central cavity in the shape of a tube. Thus, it is required to fill the cavity with additional monomer, prepolymer or polymer-dissolving monomers in order to fabricate a cavity-free preform.

Accordingly, when a plastic optical fiber is fabricated using a cavity-filling type preform, the probability of developing a discontinuity of the refractive index profile increases in proportion to the size of a cavity. This discontinuity can lead to a significant scattering at the interface of the plastic optical fiber. Such scattering may reduce the data transmission capacity of the plastic optical fiber to such a degree that the optical fiber may not be useable at all.

Furthermore, in the process of filling the cavity, the quality of the resultant preform may deteriorate due to contact with minute particles of dust, air and/or moisture. Thus, additional appliance and manufacturing expense may be required in order to prevent this contact and/or to compensate for this degradation.

SUMMARY OF THE INVENTION

A feature of the embodiments of the present invention is to provide a cavity-preventing type reactor, wherein it is not required to introduce an additional monomer.

Another feature of the present invention is to provide a method for fabricating a preform for a plastic optical fiber, wherein the refractive index gradient in a radial direction is regulated by controlling the composition of a reactant in the form of a mixture of monomers, prepolymers or polymer-dissolving monomers used in filling the cavity-preventing type reactor and/or by controlling the rotation speed of the cavity-preventing type reactor according to the desired degree of polymerization of the reactant.

According to one aspect of the present invention, there is provided a cavity-preventing type reactor, comprising an introduction part having a reactant inlet through which a reactant is introduced into the reactor, a reaction part; and at least one cavity-preventing structure, wherein the introduction part and the reaction part are adjacent and separated by a wall having a reactant flow path through which the introduction part is in communication with the reaction part, and the at least one cavity-preventing structure having at least one reactant flow path and disposed in the flow path of the reactant between the reaction part and the reactant inlet of the introduction part to allow the reactant to flow from the introduction part to the reaction part while preventing a cavity from extending into the reaction part during rotation of the reactor. The shape of the cavity-preventing structure may be cylindrical or plate-like. The reactor may be made of glass, quartz, ceramics or plastics. The radius of the reactor may be between approximately 1 and 10 cm and a length of the reactor may be 100 cm or less.

According to another aspect of the present invention, there is provided a method for fabricating a preform for a plastic optical fiber using the cavity-preventing type reactor, comprising filling the reaction part and the introduction part of the reactor with a reactant; and polymerizing the reactant in the reaction part under the rotation of the reactor.

The foregoing method for fabricating a preform may further include an additional step of charging and pressurizing any unoccupied space of the introduction part with inert gas after filling the reaction part of the introduction part of the reactor with a reactant. The foregoing method for fabricating a preform may further include pressurizing both an inner part and an outer part of the cavity-preventing type reactor during one or more of the processing steps. The foregoing method for fabricating a preform preferably may further include rotating the reactor at a constant or a varying speed. In the case of a varying speed, the varying speed may be characterized as having a simple repetition of rotating and stopping, a sinusoidal function or a function whose period, phase and/or amplitude may be varied.

The reactant for the foregoing method for fabricating a preform may be a monomer mixture comprising at least two kinds of monomers having a different refractive index relative to each other, a polymerization initiator and a chain transfer agent. Further, the at least two kinds of monomers are preferably two monomers wherein one monomer has a higher refractive index and a lower density than the other monomer, and a mixture composing the two kinds of monomers, a polymerization initiator and a chain transfer agent are charged into the introduction part and the reaction part of the reactor. In one embodiment, the monomer mixture filling the introduction part preferably has a higher refractive index than that of a monomer filling the reaction part. In another embodiment, the monomer mixture may be prepared by swelling or dissolving crushed fragments of a polymer having a lower refractive index than that of the monomer mixture in the introduction part and filling the reaction part of the reactor with the resultant monomer mixture.

In still another embodiment of the foregoing method for fabricating a preform for a plastic optical fiber according to the present invention, the filling of the reaction part of the reactor may be conducted by, after dissolving a prepolymer having a lower refractive index than that of the monomer mixture in the introduction part, filling the reaction part of the reactor with the resultant monomer mixture or by, after partially filling the reaction part with only a prepolymer, filling the remaining reaction part with a monomer mixture.

The at least two kinds of monomers are preferably selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA (2,2,3,3,3-pentafluoropropylmethacrylate), HFIPMA(1,1,1,3,3,3-hexafluoroisopropylmethacrylate) and HFBMA(2,2,3,3,4,4,4-heptafluorobuthylmethacrylate).

Further, the aforementioned polymer may be a homopolymer of a monomer selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA (2,2,3,3,4,4,4-heptafluorobuthylmethacrylate). Alternatively, the aforementioned polymer may be a copolymer, such as one selected from the group consisting of methylmethacrylate (MMA)-benzylmethacrylate(BMA) copolymer, styrene-acrylonitrile copolymer (SAN), MMA-TFEMA (2,2,2-trifluoroethylmethacrylate) copolymer, MMA-PFPMA (2,2,3,3,3-pentafluoropropylmethacrylate) copolymer, MMA-HFIPMA (1,1,1,3,3,3-hexafluoroisopropylmethacrylate) copolymer, MMA-HFBMA(2,2,3,3,4,4,4-heptafluorobuthylmethacrylate) copolymer, TFEMA-PFPMA copolymer, TFEMA-HFIPMA copolymer, styrene-methylmethacrylate copolymer and TFEMA-HFBMA copolymer.

The aforementioned prepolymer is preferably made from one or more monomers selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmetha-crylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA (2,2,3,3,4,4,4-heptafluorobuthylmethacrylate). The prepolymer preferably has a viscosity from 500 to 500,000 cps at 25° C.

In all the foregoing embodiments, the reactant of the reaction part may be polymerized using thermal polymerization or UV photopolymerization. Further, in any of the foregoing steps, the reactor may be rotated while set to an angle from −90 to 90 degrees relative to the horizontal surface.

These and other features of the present invention will be readily apparent to those of ordinary skill in the art upon review of the detailed description that follows.

DETAILED DESCRIPTION OF PREFERRED EMBODIMENTS

Priority Korean Patent Application No. 2001-43151, filed Jul. 18, 2001 and Priority Korean Application No. 2001-78965, filed Dec. 13, 2001 are hereby incorporated in their entirety by reference.

The present invention will now be described in detail with respect to preferred embodiments as illustrated in the attached drawings.

Figure 1:
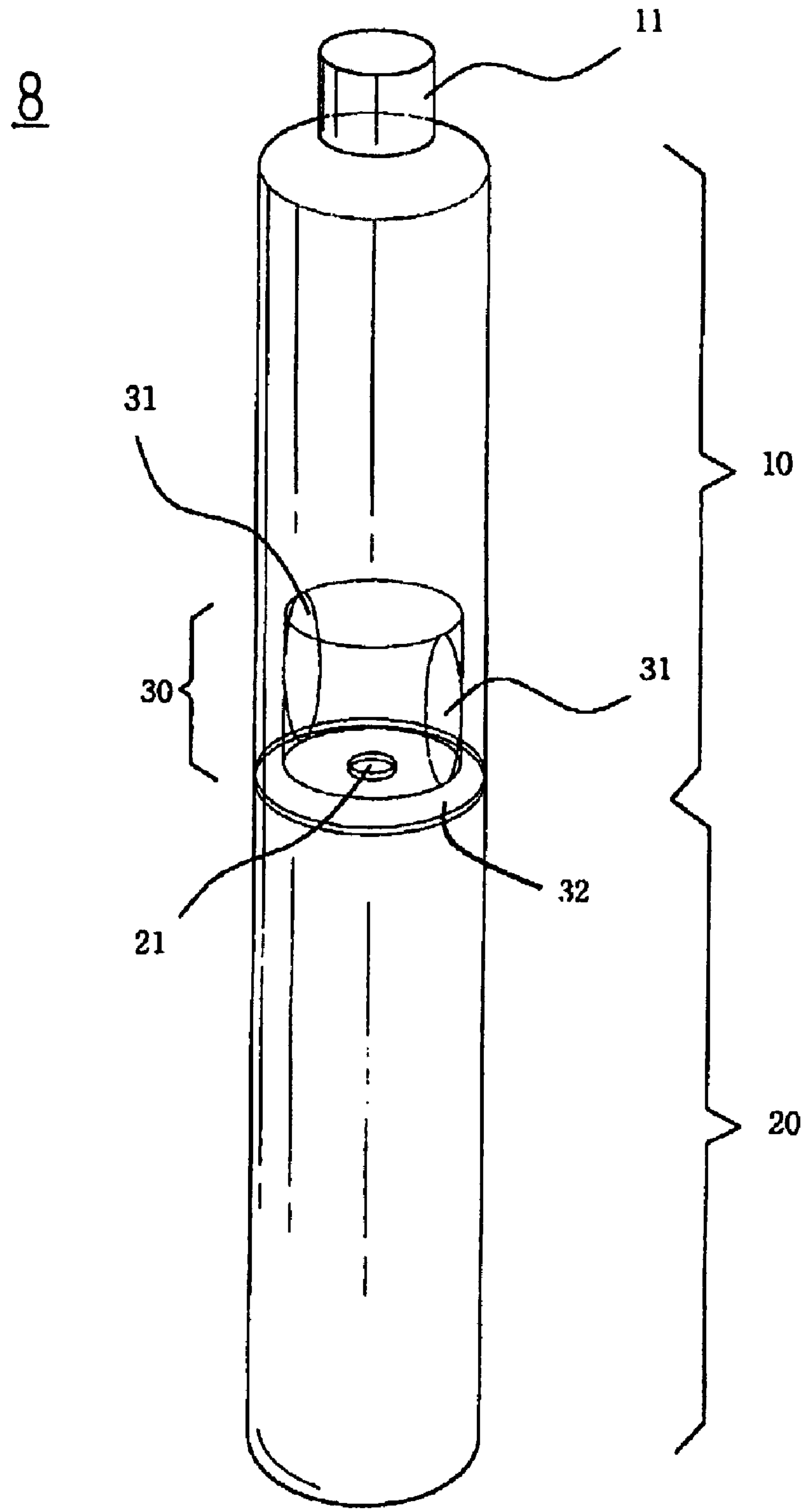
FIG. 1 illustrates a preferred embodiment of a cavity-preventing type reactor according to the present invention.

FIG. 1 illustrates a preferred embodiment of a cavity-preventing type reactor 8 according to the present invention.

The reactor 8 is preferably cylindrical and is preferably divided into an introduction part 10 and a reaction part 20. The introduction part 10 may be equipped with a reactant inlet 11 through which a reactant is fed into the whole reactor 8. The reaction part 20 may be equipped with a flow path 21 through which a reactant flows from the introduction part 10 to the reaction part 20. Between the introduction part 10 and the reaction part 20, there are preferably provided a wall 32 and a cavity-preventing structure 30. As a result, the wall 32 and the cavity preventing structure 30 prevent any cavity 34 that may have developed in the introduction part 10 from extending into the reaction part 20 when the reactor 8 is under rotation. The cavity-preventing structure 30 is equipped with flow paths 31 through which reactant flows from the introduction part 10 to the reaction part 20.

Figure 2A:
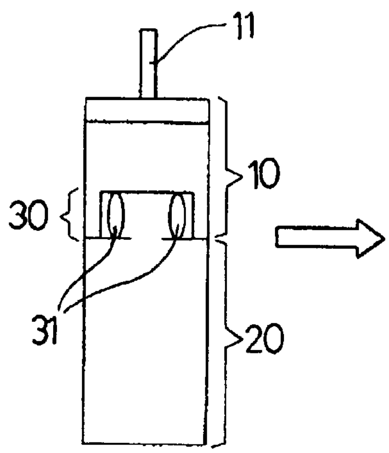
FIGS. 2A–2E illustrate a series of diagrams showing the process steps for fabricating a preform for a plastic optical fiber according to a preferred embodiment of the present invention.
Figure 2B:
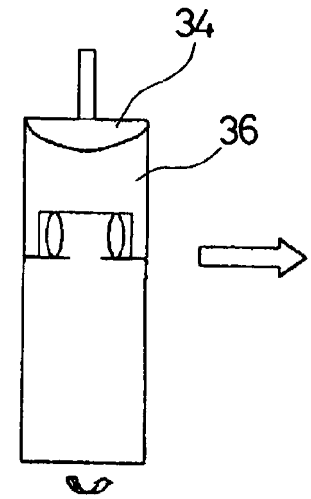
Figure 2C:
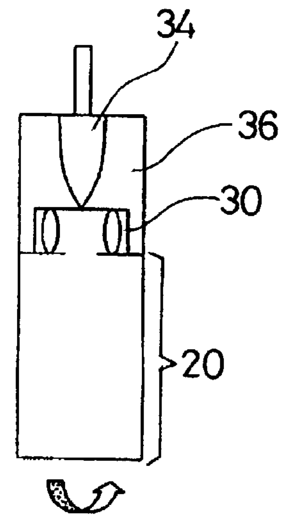
Figure 2D:
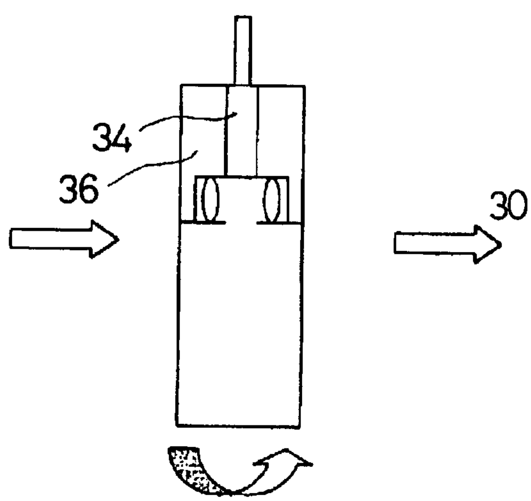

FIGS. 2*a*–2*e* illustrates a series of diagrams showing the preferred process steps for fabricating a preform for a plastic optical fiber using the preferred embodiment of the present invention depicted in the FIG. 1. When the reactor 8 is rotated, a cavity 34 develops in reactant 36 from the unoccupied space as shown in FIG. 2*b*. As the rotational force (i.e. speed) is increased, cavity 34 extends (i.e. downward) to the top of cavity-preventing structure 30 as shown in exemplary FIG. 2*c*. With further increase in the rotational force, cavity 34 becomes cylindrical as reactant 36 is forced to the sidewalls of the introduction part 10 as shown in FIG. 2*d*. However, the cavity 34 does not extend to the reaction part 20 because of the cavity-preventing structure 30.

Figure 2E:
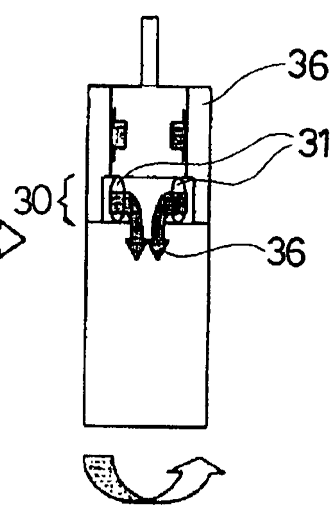

As the reactant 36 in the reaction part 20 is polymerized under the continuous rotation of the reactor 8, volume shrinkage occurs. By introducing an additional volume of reactant—which is equal to the amount of the shrunken volume, the reactant 36 flows from the introduction part 10 to the reaction part 20 through flow paths 31 of cavity-preventing structure 30 as shown in FIG. 2*e*. As can be seen in FIG. 2*e*, the flow of reactant 36 is forced back to the center of reactor 8 as it enters into reaction part 20. As a result, the cavity in the introduction part 10 become larger and no cavity is formed in the reaction part 20. It is preferable to pressurize the reactant in the introduction part 10 with an inert gas in order to assist the reactant flow from the introduction part 10 flow into the reaction part 20.

A cavity-preventing type reactor according to the present invention is not limited to the reactor 8 depicted in FIG. 1. Any reactor may be used on the condition that a cavity that developed in an introduction part 10 doesn't extend into a reaction part 20 and that the reactant in the introduction part 10 flows into the reaction part 20. For example, a diameter of a reaction part and a diameter of an introduction part may be the same as depicted in the FIG. 1 or may be different from each other. The shape of a cavity preventing structure may be cylindrical as depicted in FIG. 1 or may be plate-like. The number of cavity preventing structures may be one as depicted in FIG. 1 or may be 2 or more. An introduction part may exist above a reaction part as depicted in FIG. 1 or vice versa. It is also possible that a reaction part may lie along with the axis of rotation and is encircled with an introduction part.

Figure 3A:
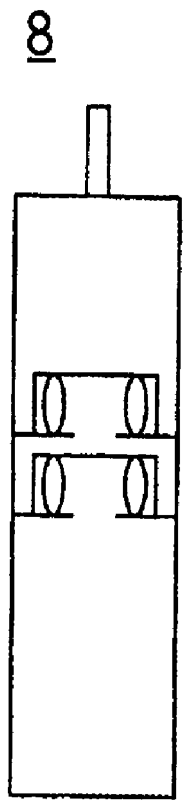
FIGS. 3A and 3B illustrate cross-sectional views of another preferred embodiment of the present invention.
Figure 3B:
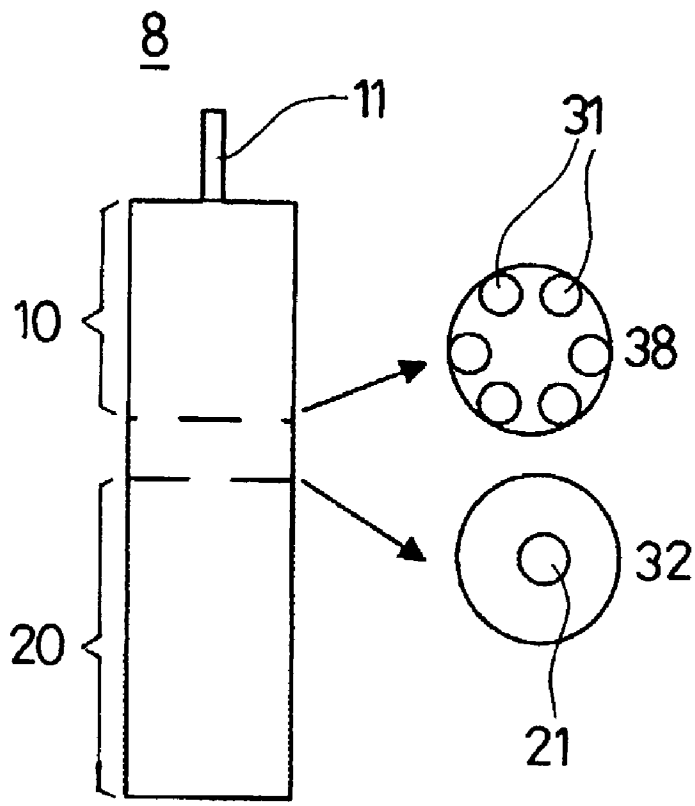

FIGS. 3(*a*) and 3(*b*) illustrate cross-sectional views of another preferred embodiment of the present invention. FIG. 3(*a*) shows a reactor 8 equipped with two cavity-preventing structures 30 having the same structure as depicted in FIG. 1. FIG. 3(*b*) shows a reactor 8 equipped with alternative exemplary plate-like cavity-preventing structures 38 or 32 between an introduction part 10 and a reaction part 20. The structure may have several flow paths 31 on the peripheral part of the plate as shown in plate-like cavity-preventing structure 38 or have a single flow path 21 as shown in plate-like cavity-preventing structure 32. The number and type of plate-like cavity-preventing structures may be any combination of the above or some other appropriate geometric arrangement.

The aforementioned embodiments are presented to exemplify the cavity-preventing type reactor of the present invention only, and are not as intended to be limiting of the scope of the present invention.

Hereinafter, a fabrication method of a preform for a plastic optical fiber, using a cavity-preventing type reactor 8 according to the present invention is disclosed in detail.

In the present invention, a reactant 36 is fed into the reaction part 20 of the cavity-preventing type reactor 8, and then is polymerized during the rotation to provide a preform for a plastic optical fiber. At this time, refractive index distribution in a radial direction of a preform for a plastic optical fiber is regulated by controlling the composition of the reactant 36 introduced to the reaction part 10 and the introduction part 20, the rotation speed of a reactor, etc.

Preferred embodiments of fabrication methods of a preform for a plastic optical fiber, wherein the cavity-preventing type reactor is used, are explained hereinafter. In the following embodiments, when particular things items are not explicitly referenced, the words such as 'reactant' should be interpreted as monomer(s), prepolymer(s) or polymer-dissolving monomer(s) containing a thermal or photo initiator and a chain transfer agent, which are available in polymerization reaction.

In a first preferred embodiment according to the present invention, the refractive index gradient of a reactant 36 filling a reaction part 20 may be made to be different from that of a reactant filling an introduction part 10 by regulating the ratios of compositions of monomers.

In a first step, two kinds of reactants 36 having the different ratios of composition of monomers are preferably prepared using two or more kinds of monomers having different refractive indexes. Then, a reaction part 20 of a reactor 8 is preferably filled with a reactant 36 having a low refractive index, and an introduction part 10 of a reactor 8 is thereafter filled with a reactant 36 having a high refractive index. Finally, the reactant in the reaction part 20 is polymerized while the reactor 8 is rotated in at either a constant or variable speed.

At this time, volume shrinkage occurs in the reaction part 20 as reaction progresses and simultaneously, the reactant 36 having a high refractive index flows from the introduction part 10 to the center of the reaction part 20. Thus, the volume shrinkage is transferred to the introduction part 20 and the refractive index of the center of the reaction part becomes high. Because volume shrinkage occurs during the polymerization process, the reactant introduced to the center of the reaction part diffuses into polymer or oligomer in the reaction part 20 to provide the preform with continuous refractive index gradient. As a result, when polymerization is completed, a preform for a plastic optical fiber with a continuous refractive index gradient in a radial direction is provided.

In a second preferred embodiment according to the present invention, a reaction part 20 and an introduction part 10 of a reactor 8 are filled with only one kind of reactant.

In a first step, a monomer having a low refractive index and high density is preferably mixed with a monomer having a high refractive index and low density to provide a reactant. The reactant is then fed into a reaction part 20 and an introduction part 10 of a cavity-preventing type reactor 8. Thirdly, the reactant in the reaction part is thermally polymerized without rotation. When polymerization is performed to a certain degree, the reactor preferably begins rotating at a constant or variable speed until polymerization is completed. Finally, a preform for a plastic optical fiber with a continuous refractive index gradient in a radial direction is provided. Thus, even if the reaction part 20 and the introduction part 10 are filled with only one kind of reactant, a monomer having a low refractive index and high density may be diffused to the outer part of the reactor under the rotation of a reactor to provide a preform for a plastic optical fiber, with a refractive index distribution, wherein a refractive index corresponding to the central part of the preform is higher than that corresponding to the outer part of the preform.

According to a third preferred embodiment of the present invention, prior to forming a core part, by filling partly the reaction part 20 with a reactant 36 and polymerizing the reactant 36 by rotating the reactor 8, a clad part is preferably formed.

In a first step, a reactant having a low refractive index is fed into reaction part 20 of a reactor 8 and is polymerized under the rotation at a constant speed to be formed as a clad part having desired thickness. Secondly, when the clad part is completely polymerized to be glassified, the reaction part 20 and the introduction part 10 are respectively filled with different monomer mixtures distinguished from each other in mixing ratio of monomers as in the first preferred embodiment of the present invention or only a single monomer mixture in the same manner as in the second preferred embodiment of the present invention. Finally, the reactant is polymerized under the rotation in a constant or variable speed to provide a preform for a plastic optical fiber, with a continuous refractive index gradient in a radial direction.

A fourth preferred embodiment of the present invention, features a first step, wherein crushed fragments of a polymer having a lower refractive index and higher density than those of a monomer mixture are preferably swelled or dissolved in the monomer mixture. In a second step, the reactant of the polymer-dissolving monomers is fed into a reaction part 20 and an introduction part 10 of a reactor 8, and then is polymerized. When the reactant in the reaction part 20 is polymerized under the rotation of the reactor, the dissolved polymer having a higher density than that of the monomer mixture moves to the outer region of the reactor to form a clad part.

This preferred embodiment of the present invention has the following advantages:

a clad part may be formed by only one reactant introduction;

relatively less heat is emitted during the polymerization process; and the volume shrinkage is significantly reduced, such that the fabrication process becomes more stable.

In this preferred embodiment of the present invention, a reaction part and an introduction part are respectively filled with different monomer mixtures distinguished from each other in mixing ratio of monomers in the same manner as the first preferred embodiment of the present invention or with only one monomer mixture in the same manner as the second preferred embodiment of the present invention.

In a fifth preferred embodiment of the present invention, a monomer mixture and a prepolymer are used together as reactants.

In a first step, the prepolymer, which has a lower refractive index and higher density than those of the monomer mixture, is prepared. Secondly, the prepolymer is mixed into the monomer mixture, and then is fed into reaction part 20 and introduction part 10. Alternatively, a reaction part may be party filled with the prepolymer, and then the remainder of the whole reactor is filled with the monomer mixture. Thirdly, polymerization is carried out under the rotation of the reactor at a constant or variable speed to provide a preform for a plastic optical fiber with a continuous refractive index gradient in a radial direction. At this time, a composition ratio of the mixture filling the introduction part 10 may be controlled differently from that of the mixture filling the reaction part 20 as in the first preferred embodiment of the invention. The viscosity of a prepolymer is preferably 500 to 500,000 cps (at 25° C.), more preferably 1,000 to 10,000 cps (at 25° C.). If viscosity of a prepolymer is less than 500 cps, it is difficult to obtain effective prepolymer addition. If viscosity of a prepolymer is more than 500,000 cps, many bubbles may be formed in a preform and it may take a long time to introduce it to the reactor.

The fifth preferred embodiment of the present invention, wherein a prepolymer is used, has the following advantages, which are similar to those of the fourth preferred embodiment of the present invention, wherein a polymer is dissolved:

a clad part can be formed using only one reactant introduction;

relatively less heat is emitted during the polymerization process; and the volume shrinkage is significantly reduced, such that the fabrication process becomes more stable.

Figure 5:
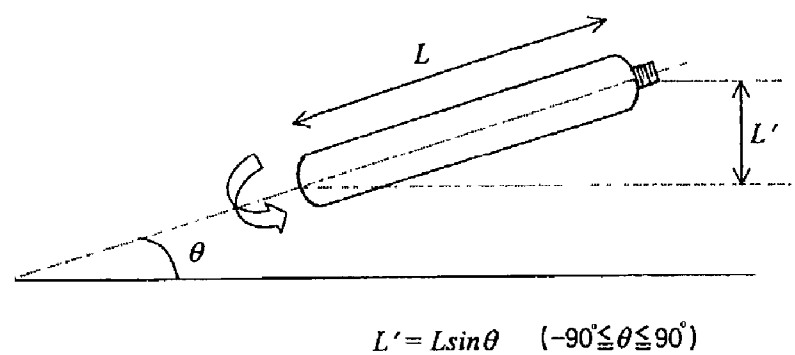
FIG. 5 illustrates a schematic view of an inclined reactor.

In a sixth preferred embodiment of the present invention, a reactor is preferably rotated while set at an angle from −90 to 90 degrees relative to the horizontal surface (see FIG. 5) in order to eliminate the refractive index gradient in an axial direction of a preform, which is caused by gravity.

Figure 4:
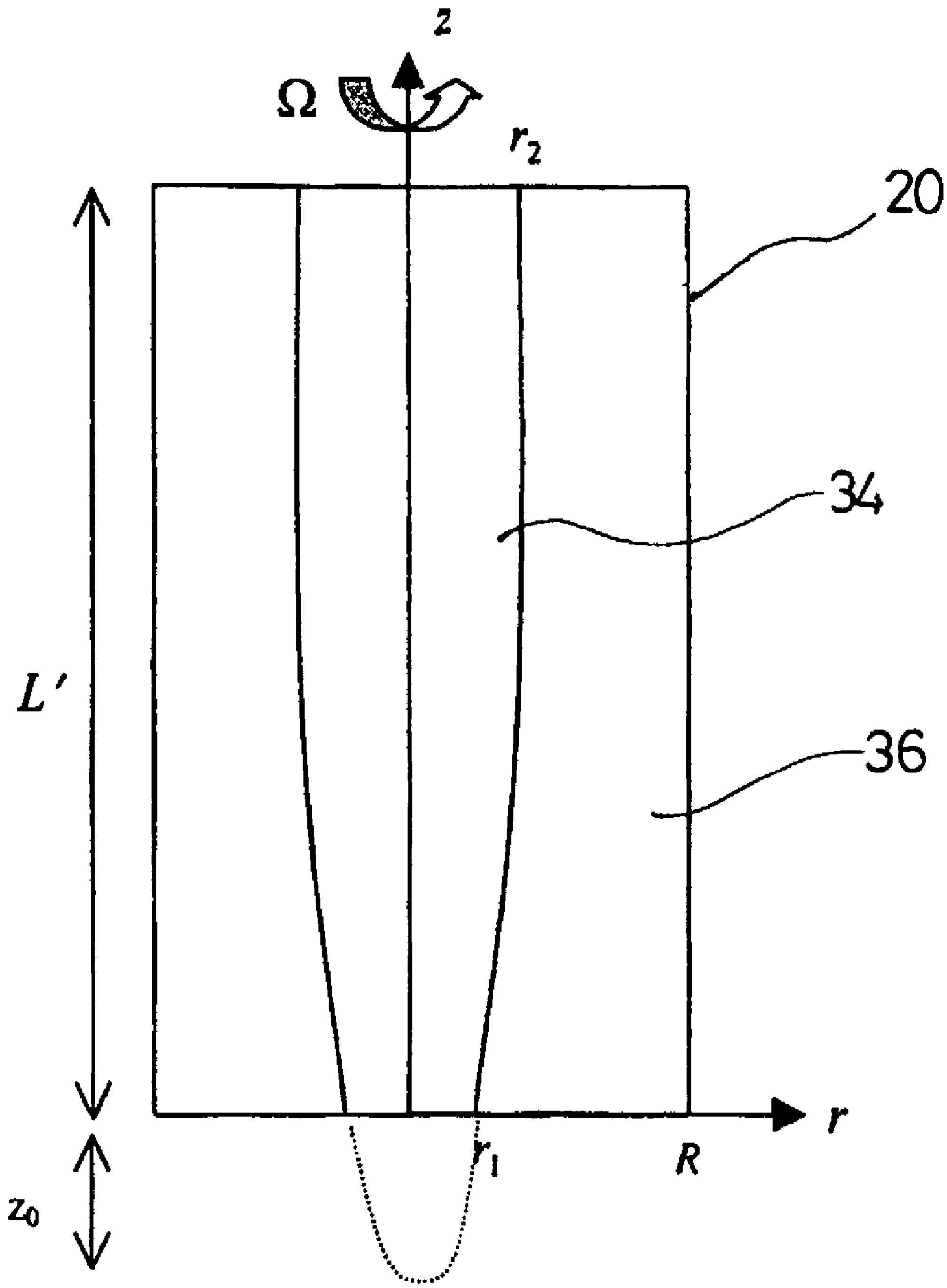
FIG. 4 illustrates a cross-sectional view of a reactor showing a cavity formed in a rotating reactor.

FIG. 4 illustrates a cross-sectional view showing a cavity 34 formed in a reactor 8 rotating about a vertical axis z. In a cavity-preventing type reactor, as the reactant 36 in a reaction part 20 is polymerized, its volume is shrunk to provide an imaginary meniscus. If this imaginary meniscus is taken into account, we can estimate the amount of the reactant 36 that flows from an introduction part 10 to a reaction part 20. This estimation can also provide a standard for a refractive index distribution profile and uniformity of refractive index gradient in an axial direction of a preform.

The meniscus of the cavity 34 of reactor 8 preferably satisfies the formula:

$$z + z_0 = \left(\frac{\Omega^2}{2g}\right)r^2 \qquad (1)$$

wherein Ω is a rotation speed (rad/s); g is a gravitational acceleration constant (about 9.8 m/s$^2$); and $z_0$ is a height(m) from the bottom of the imaginary meniscus to the real bottom of the reactor.

If a 20% volume shrinkage occurs when the reaction part 20 of the reactor 8 is filled with a monomer mixture, $Z_0$ may be induced according to the formula:

$$z_0 = \frac{\Omega^2 R^2}{10g} - \frac{L'}{2} \qquad (2)$$

A radius $r_1$ at z=0 and a radius $r_2$ at z=L' may be calculated using the formula:

$$r_1 = \sqrt{\frac{2g}{\Omega^2}z_0} \quad r_2 = \sqrt{\frac{2g}{\Omega^2}(L' + z_0)} \qquad (3)$$

By using these radii $r_1$ and $r_2$ of the above formula 3, for example, the condition under which $r_2 - r_1 < 0.01R$ is satisfied is calculated as the formula:

$$\Omega^2 > 223.6\frac{gL'}{R^2} = 223.6\frac{gL \cdot \sin\theta}{R^2} \qquad (4)$$

As seen in the above formula 4, not only raising the rotation speed (Ω) of the reactor, but also reducing the height L' along to the gravitational direction, contributes to obtaining uniformity of a refractive index gradient in an axial direction. In order to reduce the height L', a reactor can be inclined as depicted in the FIG. 5, wherein the smaller the angle θ, the smaller the height L'. When the angle θ is sufficiently small, uniformity of refractive index gradient in an axial direction can be obtained even with a small rotation speed.

In all the preferred embodiments of the present invention, a cavity due to volume shrinkage generated by polymerization is formed only in an introduction part 10. Thus, the volume of reactant 36 charged into the introduction part 10 must be regulated to secure the condition that when volume shrinkage is completed, the diameter of the bottom of the cavity 34 formed in the introduction part 10 must be less than that of the cavity preventing structure 30 in order to prevent the cavity 34 from extending into the reaction part 20.

Furthermore, it is preferable to pressurize the introduction part 10 of reactor 8 with inert gas such as argon. Such pressurization has the following advantages: reactant flow from the introduction part 10 to the reaction part 20 is aided, thus preventing a cavity 34 from forming in the reaction part 20 of a reactor 8; the polymerization reaction is made more stable; and the boiling temperature of monomer is raised. Thus, a reaction may be carried out at a higher temperature, allowing for shortened reaction time, and allowing for the reaction to be carried out without formation of bubbles due to vaporization of unreacted substances.

At this time, if a cavity-preventing type reactor is made of fragile material such as glass, quartz, ceramics or plastics and so forth, it is difficult to pressurize an inner part of the reactor, i.e., an interior of the reactor, to more than 4 bars. However, if the outer part of the cavity-preventing type reactor, i.e., an area surrounding the reactor, is pressurized at the same time, the inner pressure of a reactor may be raised to 10 bars.

Figure 6:
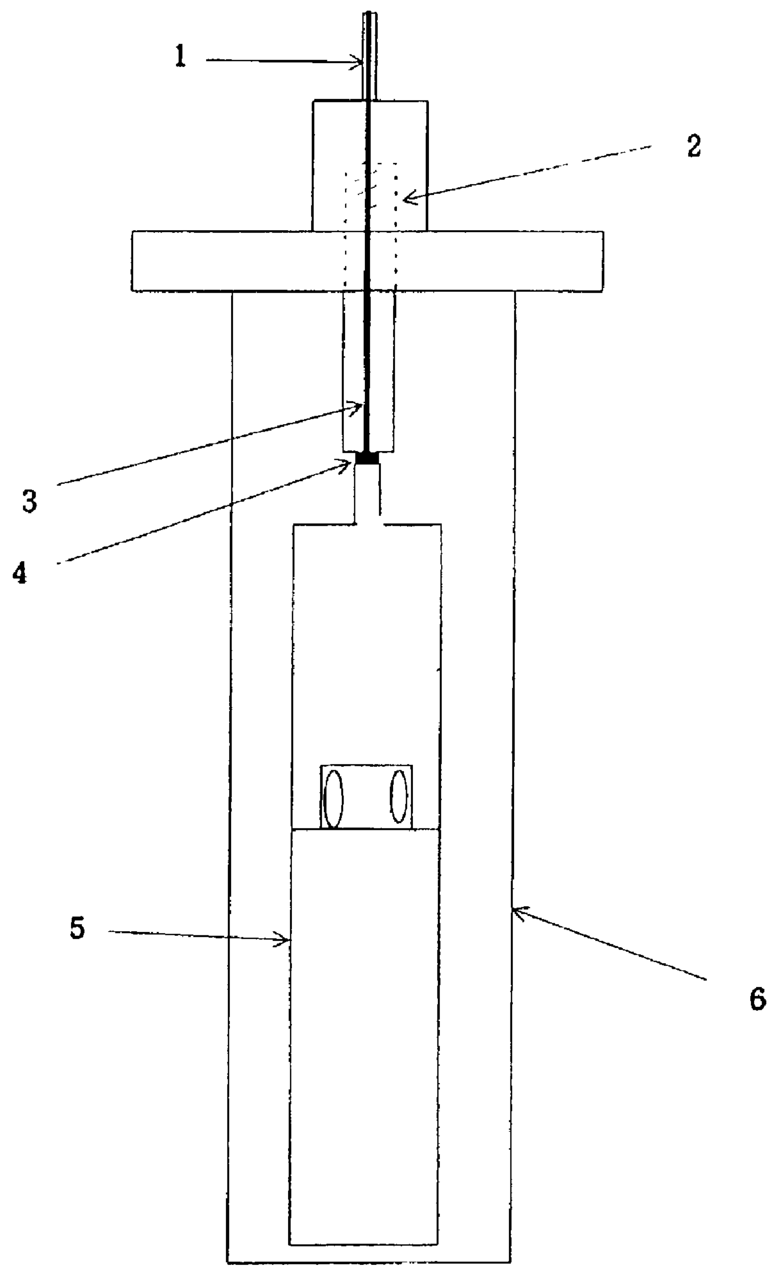
FIG. 6 illustrates a cross-sectional view of an apparatus used for pressurizing both an inner part and an outer part of a reactor.

FIG. 6 illustrates a cross-sectional view of an apparatus used for pressurizing both the inner part and the outer part of a cavity-preventing type reactor. The apparatus of FIG. 6 may be employed using the following procedure: firstly, a rotation reaction apparatus is preferably connected to an argon gas bomb through a quick connector 1 which is positioned in the upper part of the apparatus; secondly, a height-controllable lid 2 is raised; thirdly, argon gas is fed through a pressurization path 3 to an inner part of a cavity-preventing type reactor 5 and an inner part of the reaction apparatus 6. In a fourth step, the lid 2 is lowered and an O-ring (4) is pressed to seal the reaction apparatus. Thus, inner and outer parts may be simultaneously pressurized.

According to the present invention, in principle, a cavity 34 originating due to volume shrinkage in a reaction part 20 would not be formed. However, if a radical polymerization, wherein a monomer can be vaporized due to the heat generated during the radical polymerization, is carried out in a reaction part, the vaporized gas bubbles may gather together to form a cavity in the reaction part 20 under the rotation of a reactor 8. As mentioned above, pressurizing the reaction part 20 prevents bubbles from collecting in the reaction part 20, and thus a cavity-free preform may be fabricated. In all of the preferred embodiments of the present invention, polymerization in a reaction part may be carried out by using either heat or UV light.

Figure 7:
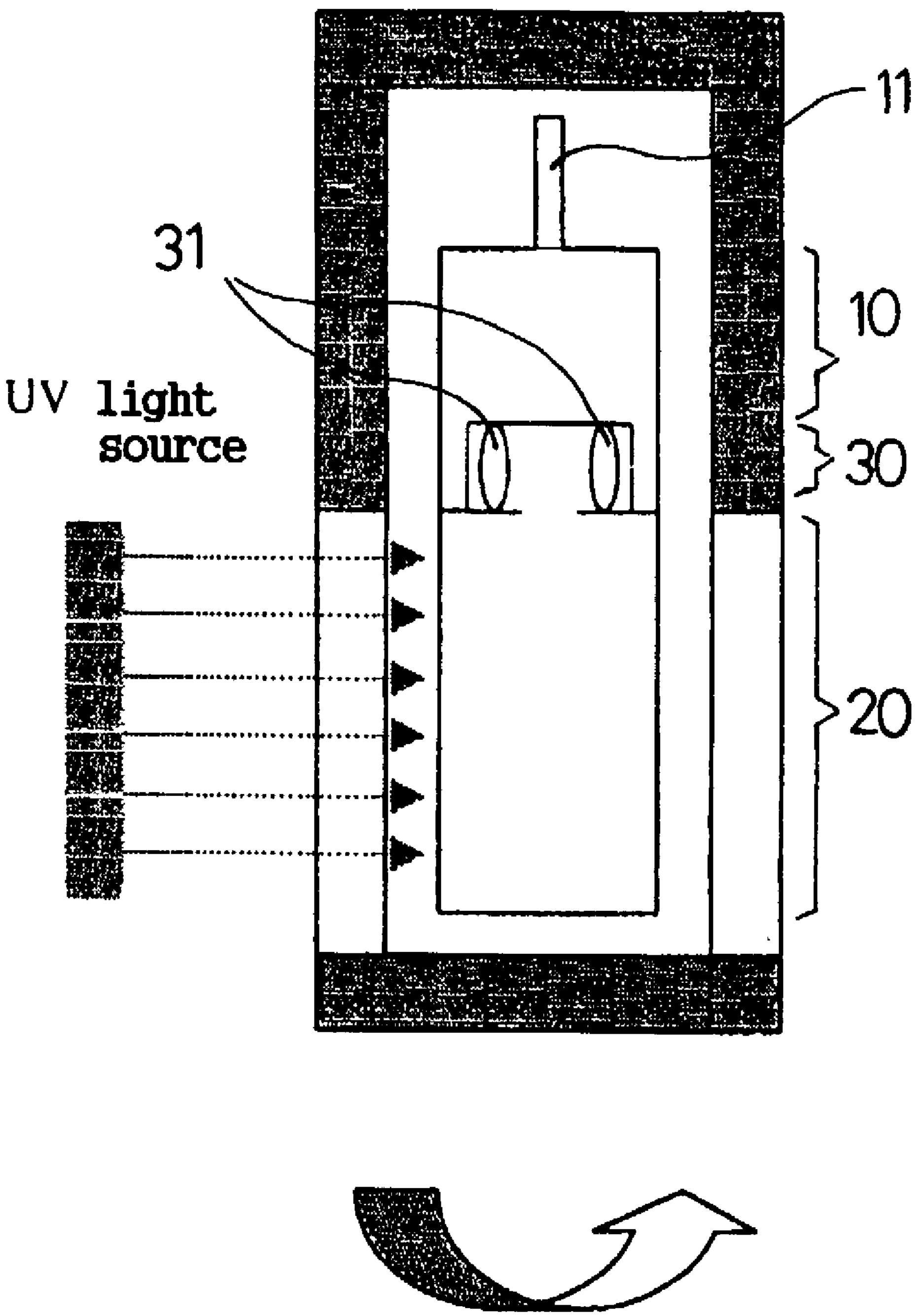
FIG. 7 illustrates a cross-sectional view of a reaction apparatus where ultraviolet (UV) light is used for polymerization.

FIG. 7 illustrates a cross-sectional view of a reaction apparatus wherein UV light is used for polymerization. When UV light is used in polymerization, a photo initiator is preferably used instead of a thermal initiator to start the reaction.

There are two significant advantages to using UV photopolymerization: 1) since there is no need to raise the temperature of a reactor, the vaporization of a monomer may be prevented thereby preventing formation of a cavity; and 2) since only the reaction part 20 is exposed to the UV light, there is no possibility that the reactant in the introduction part 10 may become classified and stop the flow of the reactant 36 to the reaction part 20. Thus, the UV photopolymerization, provides a more stable fabrication process for creating cavity-free preforms for plastic optical fiber.

In all of the preferred embodiments of the present invention, in order to obtain an improved refractive index profile, diverse changes may be given to rotation speed of the reactor 8. For example, diverse changes in the rotation speed may be the simple repetition of rotating and stopping the reactor 8, according to a sinusoidal function or a function having a variable period, phase and/or amplitude.

In general, the preferred radius of the preform is about 1 to 10 cm in order to make heat transfer for polymerization easy. The preferred length of the preform is 100 cm or less in order to achieve a proper thermal drawing.

In the foregoing, two kinds of monomers having different refractive index used in the present invention are preferably selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmetha-crylate, pentachlorophenylmethacrylate, pentabromophenylmethacrylate, styrene, TFEMA(2,2,2-trifluoroethylmethacrylate), PFPMA (2,2,3,3,3-pentafluoropropylmethacrylate), HFIPMA(1,1,1,3,3,3-hexafluoroisopropylmethacrylate) and HFBMA(2,2,3,3,4,4,4-heptafluorobutylmethacrylate).

Homopolymers or copolymers may be used as the polymers in the fourth preferred embodiment of the present invention.

The homopolymer may be polymerized from a monomer such as methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenyl-ethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA (2,2,2-tri-fluoroethylmethacrylate), PFPMA (2,2,3,3,3-pentafluoropropylmetha-crylate), HFIPMA(1,1,1,3,3,3-hexafluoroisopropylmethacrylate) and HFBMA(2,2,3,3,4,4,4-heptafluorobuthylmethacrylate).

The copolymer may include one or more selected form the group consisting of, for example, methylmethacrylate (MMA)-benzyl-methacrylate(BMA) copolymer, styrene-acrylonitrile copolymer(SAN), MMA-TFEMA(2,2,2-trifluoroethylmethacrylate) copolymer, MMA-PFPMA (2,2,3,3,3-pentafluoropropylmethacrylate) copolymer, MMA-HFIPMA (1,1,1,3,3,3-hexafluoroisopropylmethacrylate) copolymer, MMA-HFBMA (2,2,3,3,4,4,4-heptafluorobuthylmethacrylate) copolymer, TFEMA-PFPMA copolymer, TFEMA-HFIPMA copolymer, styrene-methylmethacrylate (SM) copolymer and TFEMA-HFBMA copolymer.

The prepolymer used in the fifth preferred embodiment of the present invention may be made from one or more monomers selected from the group consisting of methylmethacrylate, benzylmethacrylate, phenylmethacrylate, 1-methylcyclohexylmetha-crylate, cyclohexylmethacrylate, chlorobenzylmethacrylate, 1-pheny-lethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate), and HFBMA(2,2,3,3,4,4,4-heptafluorobutylmethacrylate).

The thermal initiator which is introduced for thermal polymerization may include, for example, 2,2'-azobis(isobutyronitrile), 1,1'-azo-bis(cyclohexanecarbonitrile), 2,2'-azobis(2,4-dimethylvaleronitrile), 2,2'-azobis(methyl-butyro-nitrile), acetyl peroxide, lauroyl peroxide, benzoyl peroxide, tert-butyl peroxide, tert-butyl hydroperoxide, azo-tert-butane, azo-normal-butane and tert-butyl peracetate.

The photo initiator that is introduced for photopolymerization may include, for example, 4-(p-tolylthio)benzophenone, 4,4'-bis(dimethylamino)benzophenone and 2-methyl-4'-(methylthio)-2-morpholino-propiophenone, 1-hydroxyl-cyclohexyl-phenyl-ketone.

The chain transfer agent that is introduced for regulating molecular weight may include, for example, n-butyl mercaptan, lauryl mercaptan and dodecyl mercaptan.

A preform for a plastic optical fiber fabricated by the above process may be subjected to a thermal drawing to transform it to a graded index plastic optical fiber (GI-POF) having a desired diameter, or may be processed to a relatively thick strand to provide a refractive index-graded lens and an image guide for picture transmission.

The present invention is now described in more detail using Examples and Comparative Examples. The Examples are intended to be only illustrative and, therefore, not intended to limit the scope of the present invention.

EXAMPLES

The cavity-preventing type reactors used in the following examples are of the same shape as depicted in FIG. 1, wherein the diameter of reactor 8 is 40 mm, the height of the introduction part 10 of the reactor is 100 mm, the height of the reaction part 20 of reactor is 120 mm, and the total height of the cavity-preventing reactor, inducing 25 mm-high inlet, is 245 mm. At least 2 monomers were selected from the group consisting of styrene monomer(SM), methyl methacrylate(MMA) and trifluoroethyl methacrylate(TFEMA). As a thermal initiator, 2,2'-azobis isobutyronitrile(AIBN) was used in MMA-SM reaction and tert-butyl peroxybenzoate(t-BPOB) was used in MMA-TFEMA reaction. As a chain transfer agent, 1-butanethiol (1-BuSH) was used.

In a UV photoreaction, as a photo initiator, 4,4'-bis (dimethylamino) benzophenone (DMABP) was used. The loss of light of a plastic optical fiber was measured by using an optical power meter using a light source having the wavelength of 660 nm after the preform was transformed into an optical fiber having a thickness of 1 mm.

Example 1

A solution consisting of 150 g of the monomer mixture made of SM and MMA at a weight ratio of 20:80, 0.066% by weight of AIBN and 0.2% by weight of 1-BuSH, based to the weight of the resultant mixed solution was charged into the reaction part 20 of the cavity-preventing type reactor 8 to the full. A solution consisting of 110 g of the monomer mixture made of SM and MMA at a weight ratio of 40:60, 0.066% by weight of AIBN and 0.2% by weight of 1-BuSH, based to the weight of the resultant mixed solution was charged into the introduction part 10 of the cavity-preventing type reactor 8 up to a height of 85 mm. The unoccupied space of the introduction part 10 was charged with argon gas having the purity of 99.999% until the inner pressure reached 1 bar. After the reactor was closed with a lid, the reaction was performed at a rotation speed of 2,500 rpm at a temperature of 70° C. for 12 hours. Subsequently, the rotation of the reactor was paused for 5 minutes, followed by rotation in a rotation speed of 2,500 rpm for 10 minutes. These procedures were repeated several dozens of times to obtain a cavity-free preform for a plastic optical fiber. The loss of light of the resultant fiber was measured at 300 dB/km.

Example 2

A solution consisting of 260 g of the monomer mixture made of SM and MMA at a weight ratio of 30:70, 0.066% by weight of AIBN and 0.2% by weight of 1-BuSH, based to the weight of the resultant mixed solution was charged into the reaction part 20 of the cavity-preventing type reactor 8 to the full. Simultaneously, the solution was charged into the introduction part 10 of the cavity-preventing type reactor up to a height of 85 mm. The unoccupied space of the introduction part 10 was charged with argon gas having the purity of 99.999% until the inner pressure reached 1 bar. After the reactor was closed with a lid, the reaction was performed in a rotation speed of 2,500 rpm at a temperature of 70° C. for 12 hours. Subsequently, the rotation of the reactor was paused for 5 minutes, followed by rotation in a rotation speed of 2,500 rpm for 10 minutes. These procedures were repeated several dozens of times to obtain a cavity-free preform for a plastic optical fiber. The loss of light of the resultant fiber was measured at 300 dB/km.

Example 3

A solution consisting of 50 g of methylmethacrylate (MMA), 0.066% by weight of AIBN and 0.2% by weight of 1-BuSH, based to the weight of the resultant solution was charged into the reaction part 20 of the cavity-preventing type reactor 8 up to a height of 40 mm. The unoccupied space of the reactor was charged with argon gas having the purity of 99.999% until the inner pressure reached 1 bar. After the reactor was closed with a lid, the reaction was performed in a rotation speed of 2,500 rpm at a temperature of 70° C. for 12 hours to form a clad layer. Subsequently, a solution consisting of 110 g of the monomer mixture made of SM and MMA at a weight ratio of 20:80, 0.066% by weight of AIBN and 0.2% by weight of 1-BuSH, based to the weight of the resultant mixed solution was heated to a temperature of 70° C., and then was charged into the reaction part 20 of the cavity-preventing type reactor 8. Subsequently, a solution consisting of 110 g of the monomer mixture made of SM and MMA at a weight ratio of 40:60, 0.066% by weight of AIBN and 0.2% by weight of 1-BuSH, based to the weight of the resultant mixed solution was heated to a temperature of 70° C., and then was charged into the introduction part 10 of the cavity-preventing type reactor 8 up to a height of 85 mm. The unoccupied space of the introduction part 10 was charged with argon gas having the purity of 99.999% until the inner pressure reached 1 bar. After the reactor was closed with a lid, the reaction was performed in a rotation speed of 2,500 rpm at a temperature of 70° C. for 12 hours. Subsequently, the rotation of the reactor was paused for 5 minutes, followed by rotation in a rotation speed of 2,500 rpm for 10 minutes. These procedures were repeated several dozens of times to obtain a cavity-free preform for a plastic optical fiber. The loss of light of the resultant fiber was measured at 260 dB/km.

Example 4

A solution of 50 g of methylmethacrylate (MMA), 0.066% by weight of AIBN and 0.2% by weight of 1-BuSH, based to the weight of the resultant solution was reacted at a temperature of 70° C. for 24 hours to provide a polymer. Subsequently, the polymer was dissolved in a solution consisting of 110 g of the monomer mixture made of SM and MMA at a weight ratio of 20:80, 0.066% by weight of AIBN and 0.2% by weight of 1-BuSH, based to the weight of the resultant mixed solution. The polymer-dissolved solution was charged into the reaction part 20 of the cavity-preventing type reactor 8. Subsequently, A solution consisting of 110 g of the monomer mixture made of SM and MMA at a weight ratio of 40:60, 0.066% by weight of AIBN and 0.2% by weight of 1-BuSH, based to the weight of the resultant mixed solution was heated to a temperature of 70° C., and was charged into the introduction part 10 of the cavity-preventing type reactor 8 up to a height of 85 mm. The unoccupied space of the introduction part was charged with argon gas having the purity of 99.999% until the inner pressure reached 1 bar. After the reactor was closed with a lid, the reaction was performed in a rotation speed of 2,500 rpm at a temperature of 70° C. for 12 hours. Subsequently, the rotation of the reactor was paused for 5 minutes, followed by continuous rotation having a rotation speed of 2,500 rpm for 10 minutes. These procedures were repeated several dozens of times to obtain a cavity-free preform for a plastic optical fiber. The loss of light of the resultant fiber was measured at 250 dB/km.

Example 5

50 g of methylmethacrylate (MMA), 0.066% by weight of AIBN and 0.2% by weight of 1-BuSH, based to the weight of the resultant solution were polymerized at a temperature of 70° C. for 4 hours to provide a prepolymer. The resultant prepolymer was introduced into the reaction part of the cavity-preventing type reactor to a height of 40 mm. Subsequently, a solution consisting of 110 g of the monomer mixture made of SM and MMA at a weight ratio of 20:80, 0.066% by weight of AIBN and 0.2% by weight of 1-BuSH, based to the weight of the resultant mixed solution was charged into the remaining reaction part 20 of the cavity-preventing type reactor 8 to the full. After that, a mixed solution consisting of 110 g of the monomer mixture made of SM and MMA at a weight ratio of 40:60, 0.066% by weight of AIBN and 0.2% by weight of 1-BuSH, based to the weight of the resultant mixed solution was charged into the introduction part 10 of the cavity-preventing type reactor 8. The unoccupied space of the introduction part 10 was charged with argon gas having the purity of 99.999% until the inner pressure reached 1 bar. After the reactor was closed with a lid, the reaction was performed in a rotation speed of 2,500 rpm at a temperature of 70° C. for 9 hours. Subsequently, the rotation of the reactor was paused for 5 minutes, followed by continuous rotation in a rotation speed of 2,500 rpm for 10 minutes. These procedures were repeated several dozens of times to obtain a cavity-free preform for a plastic optical fiber. The loss of light of the resultant fiber was measured at 230 dB/km.

Example 6

A solution consisting of 260 g of the monomer mixture made of SM and MMA at a weight ratio of 30:70, 0.066% by weight of AIBN and 0.2% by weight of 1-BuSH, based to the weight of the resultant mixed solution was charged into the reaction part 20 of the cavity-preventing type reactor 8 and simultaneously, was introduced into the introduction 10 part of the cavity-preventing type reactor 8 up to a height of 85 mm. The unoccupied space of the introduction part 10 was charged with argon gas having the purity of 99.999% until the inner pressure reached 1 bar. After the reactor was closed with a lid, the reactor was set to an angle of +15 degrees relative to the horizontal surface and then, was rotated in a rotation speed of 1,000 rpm at a temperature of 70° C. for 12 hours. Subsequently, the rotation of the reactor was paused for 5 minutes, followed by continuous rotation in a rotation speed of 2,500 rpm for 10 minutes. These procedures were repeated several dozens of times to obtain a cavity-free preform for a plastic optical fiber. The loss of light of the resultant fiber was measured at 290 dB/km.

Example 7

A solution consisting of 260 g of the monomer mixture made of SM and MMA at a weight ratio of 30:70, 0.066 wt % of DMABP and 0.2 wt % of 1-BuSH, based to the weight of the resultant solution was charged into the reaction part 20 of the cavity-preventing type reactor 8 and simultaneously, into the introduction part 10 of the cavity-preventing type reactor 8 up to a height of 85 mm. The unoccupied space of the introduction part 10 was charged with argon gas having the purity of 99.999% until the inner pressure reached 1 bar. After the reactor was closed with a lid, the reactor was rotated in a rotation speed of 2,500 rpm at a temperature of 40° C. for 12 hours with being exposed to UV by use of the same UV radiation apparatus as depicted in FIG. 7. Subsequently, the rotation of the reactor was paused for 5 minutes, followed by continuous rotation in a rotation speed of 2,500 rpm for 10 minutes. These procedures were repeated several dozens of times to obtain a cavity-free preform for a plastic optical fiber. The loss of light of the resultant fiber was measured at 300 dB/km.

Example 8

A solution consisting of 170 g of the monomer mixture made of MMA and TFEMA at a weight ratio of 70:30, 0.066 wt % of t-BPOB and 0.25 wt % of 1-BuSH, based to the weight of the resultant solution was charged into the reaction part 20 of the cavity-preventing type reactor 8. After the reactor was closed with a lid, the reaction was carried out at a temperature of 70° C. for 12 hours without rotation. Additionally, the reaction was carried out in a rotation speed of 2,500 rpm at a temperature of 70° C. for 12 hours to form a clad layer. Subsequently, a solution consisting of 150 g of the monomer mixture made of MMA and TFEMA at a weight ratio of 90:10, 0.066 wt % of t-BPOB and 0.25 wt % of 1-BuSH, based to the weight of the resultant solution was heated up to 70° C. and then charged into the reaction part 20 of the cavity-preventing type reactor 8. After that, a mixed solution consisting of 120 g of MMA, 0.066% by weight of t-BPOB and 0.2% by weight of 1-BuSH, based to the weight of the resultant solution was heated to a temperature of 70° C., and was charged into the introduction part 10 of the cavity-preventing type reactor 8 up to a height of 85 mm. The unoccupied space of the introduction part 10 was charged with argon gas having the purity of 99.999% until the inner pressure reached 1 bar. The reactor was closed with a lid, the reaction was carried out in a rotation speed of 2,500 rpm at a temperature of 70° C. for 12 hours. After that, the rotation of the reactor was paused for 5 minutes, followed by rotation in a rotation speed of 2,500 rpm for 10 minutes. These procedures were repeated several dozens of times to obtain a cavity-free preform for a plastic optical fiber. The loss of light of the resultant fiber was measured at 150 dB/km.

Example 9

A solution consisting of 150 g of the monomer mixture made of SM and MMA at a weight ratio of 10:90, 0.066 wt % of AIBN and 0.2 wt % of 1-BuSH, based to the weight of the resultant solution was charged into the reaction part 20 of the cavity-preventing type reactor 8 to the full. Subsequently, a solution consisting of 110 g of the monomer mixture made of SM and MMA at a weight ratio of 20:80, 0.066 wt % of AIBN and 0.2 wt % of 1-BuSH, based to the weight of the resultant solution was charged into the introduction part 10 of the cavity-preventing type reactor 8 up to a height of 85 mm. The same rotation reaction apparatus as depicted in FIG. 6 was equipped with the cavity-preventing type reactor 8, and then argon gas was led through a pressurization path (3) to an inner part of the cavity-preventing type reactor (5) and an inner part of the reaction apparatus (6) and was simultaneously pressurized to 10 bars. After that, the lid (2) was lowered and an O-ring (4) was pressed. After the reaction was carried out in a rotation speed of 2,500 rpm at a temperature of 110° C. for 4 hours, the temperature was lowered to 90° C. The rotation of the reactor was paused for 5 minutes, followed by rotation in a rotation speed of 2,500rpm for 10 minutes at a temperature of 110° C. The procedures were repeated several dozens of times. After 8 hours, a cavity-free preform for a plastic optical fiber was obtained. The loss of light of the resultant fiber was measured at 250 dB/km.

The reactivity of SM is so analogous to that of MMA that the preform made therefrom is an amorphous random copolymer. Even if the reactivity of TFEMA is lower to that of MMA, a transparent amorphous copolymer is made therefrom in all the aforementioned composition ratios.

The present invention provides a new cavity-preventing type reactor and a method for fabricating a preform for a plastic optical fiber having a continuous refractive index gradient and thus no discontinuity of refractive index profile in a radial direction by using the same wherein it is needless to introduce reactants additionally.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A cavity-preventing type reactor, comprising:

an introduction part having a reactant inlet through which a reactant is introduced into the reactor;

a reaction part; and at least one cavity-preventing structure, wherein the introduction part and the reaction part are adjacent and separated by a wall having a reactant flow path through which the introduction part is in communication with the reaction part, the introduction part and the reaction part being operable to rotate simultaneously, and the at least one cavity-preventing structure being attached to the wall and having at least one reactant flow path and disposed in the flow path of the reactant between the reaction part and the reactant inlet of the introduction part to allow the reactant to flow from the introduction part to the reaction part while preventing a cavity from extending into the reaction part during rotation of the introduction part and the reaction part.

2. The cavity-preventing type reactor as claimed in claim 1, wherein the shape of the cavity-preventing structure is cylindrical or plate-like.

3. The cavity-preventing type reactor as claimed in claim 1, wherein the reactor is made of glass, quartz, ceramics or plastics.

4. The cavity-preventing type reactor as claimed in claim 1, wherein a radius of the reactor is between approximately 1 and 10 cm and a length of the reactor is 100 cm or less.

5. A method for fabricating a preform for a plastic optical fiber using a cavity-preventing type reactor having a reactant introduction part, a reaction part, and at least one cavity-preventing structure interposed therebetween, wherein the introduction part and the reaction part are adjacent and separated by a wall having a reactant flow path through which the introduction part is in communication with the reaction part, and wherein the cavity-preventing structure is attached to the wall and has at least one reactant flow path and is disposed in the flow path of the reactant between the reaction part and the reactant inlet of the introduction part to allow the reactant to flow from the introduction part to the reaction part while preventing a cavity from extending into the reaction part during rotation of the introduction part and the reaction part, comprising:

filling the reaction part and the introduction part of the reactor with a reactant;

rotating the introduction part and the reaction part simultaneously; and polymerizing the reactant in the reaction part under the rotation of the introduction part and the reaction part.

6. The method for fabricating a preform for a plastic optical fiber as claimed in claim 5, further comprising charging and pressurizing unoccupied space in the introduction part with inert gas.

7. The method for fabricating a preform for a plastic optical fiber as claimed in claim 6, further comprising pressurizing both an interior of the cavity-preventing type reactor and an area surrounding the cavity-preventing type reactor.

8. The method for fabricating a preform for a plastic optical fiber as claimed in claim 5, wherein the introduction part and the reaction part are rotated at a constant or varying speed.

9. The method for fabricating a preform for a plastic optical fiber as claimed in claim 8, wherein the varying speed of rotation of the introduction part and the reaction part follows a simple repetition of rotating and stopping, a sinusoidal function or a function whose period, phase and/or amplitude is varied.

10. The method for fabricating a preform for a plastic optical fiber as claimed in claim 5, wherein the reactant is a monomer mixture comprised of at least two kinds of monomers having a different refractive index relative to each other, a polymerization initiator and a chain transfer agent.

11. The method for fabricating a preform for a plastic optical fiber as claimed in claim 10, wherein the at least two kinds of monomers are two monomers wherein one monomer has a higher refractive index and a lower density than the other monomer, and the monomer mixture comprised of the two kinds of monomers, a polymerization initiator and a chain transfer agent are charged into the introduction part and the reaction part of the reactor.

12. The method for fabricating a preform for a plastic optical fiber as claimed in claim 10, wherein a monomer mixture filling the introduction part has a refractive index that is higher than that of a monomer filling the reaction part.

13. The method for fabricating a preform for a plastic optical fiber as claimed in claim 10, wherein crushed fragments of a polymer having a lower refractive index than that of the monomer mixture are swelled or dissolved in the monomer mixture before the monomer mixture is introduced to the reaction part.

14. The method for fabricating a preform for a plastic optical fiber as claimed in claim 10, wherein a prepolymer having a lower refractive index than that of the monomer mixture is dissolved in the monomer mixture or partially filled in the reaction part before the monomer mixture is introduced to the reaction part.

15. The method for fabricating a preform for a plastic optical fiber as claimed in claim 10, wherein the at least two kinds of monomers are selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA (2,2,3,3,3-pentafluoropropylmethacrylate), HFIPMA(1,1,1,3,3,3-hexafluoroisopropylmethacrylate) and HFBMA(2,2,3,3,4,4,4-heptafluorobutylmethacrylate).

16. The method for fabricating a preform for a plastic optical fiber as claimed in claim 13, wherein the polymer is a homopolymer of a monomer selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobutylmethacrylate).

17. The method for fabricating a preform for a plastic optical fiber as claimed in claim 13, wherein the polymer is a copolymer selected from the group consisting of methylmethacrylate(MMA)-benzylmethacrylate(BMA) copolymer, styrene-acrylonitrile copolymer (SAN), MMA-TFEMA (2,2,2-trifluoroethylmethacrylate) copolymer, MMA-PFPMA(2,2,3,3,3-pentafluoropropylmethacrylate) copolymer, MMA-HFIPMA (1,1,1,3,3,3-hexafluoroisopropylmethacrylate) copolymer, MMA-HFBMA (2,2,3,3,4,4,4-heptafluorobutylmethacrylate) copolymer TFEMA-PFPMA copolymer, TFEMA-HFIPMA copolymer, styrene-methylmethacrylate copolymer and TFEMA-HFBMA copolymer.

18. The method for fabricating a preform for a plastic optical fiber as claimed in claim 14, wherein the prepolymer is made from one or more monomers selected from the group consisting of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, furfurylmethacrylate, 1-phenylcyclohexylmethacrylate, pentachlorophenylmethacrylate, pentabromophenylmethacrylate, styrene, TFEMA(2,2,2-trifluoroethylmethacrylate), PFPMA(2,2,3,3,3-pentafluoropropylmethacrylate), HFIPMA(1,1,1,3,3,3-hexafluoroisopropylmethacrylate) and HFBMA(2,2,3,3,4,4,4-heptafluorobutylmethacrylate).

19. The method for fabricating a preform for a plastic optical fiber as claimed in claim 14, wherein the prepolymer has a viscosity of from 500 to 500,000 cps at 25° C.

20. The method for fabricating a preform for a plastic optical fiber as claimed in claim 5, wherein the reactant of the reaction part is polymerized through thermal polymerization or UV photopolymerization.

21. The method for fabricating a preform for a plastic optical fiber as claimed in claim 5, wherein the reactor is rotated while set to an angle of from −90 to 90 degrees relative to a horizontal surface.

* * * * *